United States Patent
Moritz (10) Patent No.: US 8,345,066 B2
(45) Date of Patent: Jan. 1, 2013

(54) DEVICE AND METHOD FOR SIMULTANEOUSLY REPRESENTING VIRTUAL AND REAL AMBIENT INFORMATION

(75) Inventor: Soeren Moritz, Wimmelbach (DE)

(73) Assignee: Siemens Aktiengesellschaft, München (DE)

( * ) Notice: Subject to any disclaimer, the term of this patent is extended or adjusted under 35 U.S.C. 154(b) by 815 days.

(21) Appl. No.: 11/547,503

(22) PCT Filed: Mar. 16, 2005

(86) PCT No.: PCT/EP2005/051195
§ 371 (c)(1),
(2), (4) Date: Oct. 2, 2006

(87) PCT Pub. No.: WO2005/096638
PCT Pub. Date: Oct. 13, 2005

(65) Prior Publication Data
US 2007/0202472 A1    Aug. 30, 2007

(30) Foreign Application Priority Data
Apr. 2, 2004    (DE) .......................... 10 2004 016 331

(51) Int. Cl.
*G09G 5/00* (2006.01)
(52) U.S. Cl. .......................... 345/633; 345/421; 345/629
(58) Field of Classification Search .................. 345/632, 345/633, 629, 626
See application file for complete search history.

(56) References Cited

U.S. PATENT DOCUMENTS

| | | | | |
|---|---|---|---|---|
| 5,428,724 A * | 6/1995 | Silverbrook | .................. | 345/640 |
| 5,923,333 A * | 7/1999 | Stroyan | .......................... | 345/422 |
| 5,986,674 A * | 11/1999 | Yamato | .......................... | 345/441 |
| 6,151,009 A * | 11/2000 | Kanade et al. | ................ | 345/641 |
| 6,166,744 A * | 12/2000 | Jaszlics et al. | ................ | 345/629 |
| 6,335,765 B1 * | 1/2002 | Daly et al. | ..................... | 348/586 |
| 7,106,275 B2 * | 9/2006 | Brunner et al. | ................. | 345/32 |
| 2002/0057280 A1 | 5/2002 | Anabuki | | |
| 2002/0075286 A1 * | 6/2002 | Yonezawa et al. | ............. | 345/679 |
| 2002/0133264 A1 * | 9/2002 | Maiteh et al. | ................. | 700/182 |
| 2003/0032484 A1 * | 2/2003 | Ohshima et al. | ................ | 463/43 |
| 2005/0215879 A1 * | 9/2005 | Chuanggui | .................... | 600/407 |

FOREIGN PATENT DOCUMENTS

| | | | |
|---|---|---|---|
| DE | 101 28 015 A1 | 12/2001 | |
| DE | 102 40 392 A1 | 3/2004 | |

OTHER PUBLICATIONS

U.S. Appl. No. 60/552,565, Chuanggui, Mar. 12, 2004.*

(Continued)

Primary Examiner — Michelle L Sams (57) ABSTRACT

The invention relates to a device and a method for representing virtual and real environment information for at least one user, whereby virtual arrangements and real arrangements are represented in such a way that masking of the virtual arrangements by real arrangements can be identified. The relative position and orientation of the device in the real environment are detected by means of an environment detection unit. In addition, a detection of the reality and the conversion thereof into a 3-dimensional surface model is continuously carried out by means of a spatial detection unit. A processing system transfers the 3-dimensional surface model of the real arrangements and the 3-dimensional model of the virtual arrangement into a common co-ordinates system and calculates possible masking surfaces of the virtual arrangement by the real arrangement.

20 Claims, 4 Drawing Sheets

OTHER PUBLICATIONS

Jan Fischer, Holger Regenbrecht and Gregory Baratoff, "Detecting Dynamic Occlusion in front of Static Backgrounds for AR Scenes", proceedings of Eurographics Workshop on Virtual Environments, May 2003, pp. 153-161, XP002268879.

Matthias M. Wloka and Brian G. Anderson, "Resolving Occlusion in Augmented Reality", proceedings of the Symposium on Interactive 3D Graphics, Monterey, CA on Apr. 9-12, 1995, pp. 5-12, XP000546182, ISBN: 0-89791-736-7.

Wloka M M et al; "Resolving Occlusion in Augmented Reality"; Proceedings of the Symposium on Interactive 3D Graphics, Monterey; Proceedings of the Symposium on Interactive 3D Graphics; XP000546182; Others; 1995; US.

Wagner et al: First Steps Towards Handheld Augmented Reality; Oct. 21, 2003; p. 127-135, XP010673786; ISBN: 978-0-7695-2034-6; Others; 2003; US.

Geiger et al: Mobile AR4ALL; USA Oct. 29-30, 2001, p. 181-182, XP010568065; ISBN: 978-0-7695-1375-1; Others; 2001; US.

Rekimoto J. et al: "The World Through the Computer: Computer Augmented interaction with Real World Environments"; 8th Annual Symposium on User Interface Software and Technology. Pittsburgh, PA, Nov. 14-17, 1995; p. 29-36; XP000634412; ISBN: 978-0-89791-709.4; Others; 1995; US.

Zhao Feng-ji et al: "A mobile robot localization using ultrasonic sensors in indoor environment"; 6th IEE E International Workshop on Sendai, Japan; Sep. 29 bis Oct. 1, 1997, New York, NY, USA, IEEE, US, Sep. 29, 1997; p. 52-57; XP 010263258; ISBN: 978-0-7803-4076-3; Others; 1997; US.

Ronald T. Azuma: "A Survey of Augmented Reality"; Presence, Cambridge, MA, US; Aug. 1, 1997, p. 1-48; XP002254668; ISSN: 1054-7460; Others; 1997; US.

Einsele, T: "Real-Time-Self-Localization in Unknown Indoor Environments using a Panorama Laser Range Finder"; Intelligent Robots An Dsystems, 1997. IROS '97., Proceedings of the 1997 IEEE/RSJ International Conference on Grenoble, Fance Sep. 7-11, 1997, New York, NY, USA, IEEE, US. vol. 2, (Sep. 7, 1997), p. 697-702; XP010264722, ISBN: 978-0-7803-4119-7; Others; 1997; US.

Piekarski W. et al: "Interactive augmented reality techniques for construction at a distance of 3D geometry", IPT/EGVE 2003. Seventh Immersive Projection Technology Workshop. Ninth Eurographics Workshop on Virtual Environments Eurographics Assoc. Aire-La-Ville, Switzerland, 2003, p. 19-28, ISBN: 3-905673-00-2; Others; 2003; CH.

* cited by examiner

DEVICE AND METHOD FOR SIMULTANEOUSLY REPRESENTING VIRTUAL AND REAL AMBIENT INFORMATION

CROSS REFERENCE TO RELATED APPLICATIONS

This application is the U.S. National Stage of International Application No. PCT/EP2005/051195, filed Mar. 16, 2005 and claims the benefit thereof. The International Application claims the benefits of German Patent application No. 10 2004 016 331.6 filed Apr. 2, 2004. All of the applications are incorporated by reference herein in their entirety.

FIELD OF THE INVENTION

The invention relates to a device and a method for representing information, in particular augmented-reality information, for at least one user.

BACKGROUND OF THE INVENTION

Such a device is used, for example, in the planning of installations and machines. By means of this device, even at the planning stage, it is intended that a first impression is obtained of a planned installation or a planned alteration in an ambient which already exists.

Augmented reality (AR) is a form of human-computer-interaction which, for example via data spectacles, inserts information into the field of view of the person and thus augments the actual reality visible to the person. This takes place in a context-dependent manner, i.e. adapted to and diverted from the object under consideration, for example a component, a tool, a machine or at its location. An example thereof may be a safety instruction during an assembling/dismantling process.

Two conventional methods exist for the representation of augmented reality. With so-called optical see-through (OST) systems, the virtual information is directly inserted into the field of view of the user, the user additionally being able to observe the reality directly. In this case, typically a miniature monitor worn on the head, a so-called head-mounted display, is used for representing the image information. With so-called video see-through (VST) systems, the reality is detected via a video camera. The virtual information is inserted into the recorded video image. The image information thus generated may then be displayed by one or more head-mounted displays or with a standard display such as a monitor. Thus a plurality of users are able to observe the augmented reality, for example even at a remote location. With video see-through systems, the video camera and the spatial detection system are even able to be mounted on the head of the user. In current practice, however, the video camera—and thus advantageously the spatial detection system—is mounted on a portable computer (for example a tablet PC).

SUMMARY OF THE INVENTION

The object of the invention is to provide a device and/or a method for representing information, in particular augmented-reality information, for at least one user which, with reduced expenditure of time and money, allows the planning of new installations and/or augmenting existing installations in a currently existing ambient, dynamic processes of both the real and the virtual ambient additionally being able to be detected and represented.

This object is achieved by a device for representing information, in particular augmented reality information, for at least one user with
at least one spatial detection unit for detecting an actual reality and for generating corresponding spatial information,
at least one ambient detection unit for detecting an ambient and for generating corresponding ambient information which identify a position and/or an orientation of the device relative to the ambient,
at least one processing unit for linking the ambient information, the spatial information and information filed in a first storage medium, which serve to describe at least one object, to a set of image information such that reciprocal masking of the actual reality and the object described by the filed information are made recognizable by at least one reproducing unit.

This object is further achieved by a method for representing information, in particular augmented reality information, for at least one user in which
by means of at least one spatial detection unit an actual reality is detected and corresponding spatial information is generated,
by means of at least one ambient detection unit an ambient is detected and corresponding ambient information is generated which identify a position and/or an orientation of the device relative to the ambient,
by means of at least one processing unit the ambient information, the spatial information and information filed in a first storage medium, which serve to describe at least one object, are linked to a set of image information such that reciprocal masking of the actual reality and the object described by the filed information is made recognizable by at least one reproducing unit.

In the device according to the invention and/or the method according to the invention, an AR system known from the prior art is supplemented by a spatial detection unit which allows continuous detection of the actual reality. The spatial detection unit recognizes which surfaces are located in a detection region of the device and the distance of these surfaces to the device. By means of an ambient detection unit, the relative position and orientation of the device relative to the real ambient are detected. By means of a processing system, the data generated by the spatial detection unit and the ambient detection unit are linked to a further data set describing at least one object, such that reciprocal masking in the field of vision of the user is made visible in a representation of the reality detected and of the objects described by the data set.

The invention is based on the recognition that, when planning new installations and/or augmenting existing installations in a currently existing ambient, questions have to be answered relative to spatial aspects, such as:
can a new component of the installation be built in a specific position?
how can it be installed?
can collisions occur between moving machine parts and people?

These questions may be answered by the device according to the invention and/or the system according to the invention by means of AR systems, without a complete three-dimensional model of the real existing ambient having to be generated with a large expenditure in time and money. By means of the information describing the reality detected, masking of the planned installation, which is represented in the form of a virtual three-dimensional model, may be calculated and represented in the augmented reality by blanking out.

The continuous detection of the actual reality located in the detection region of the device, also allows a visualization of the virtual arrangement and a dynamic, which is present in the real ambient, within the augmented reality. In this connection, the considerable cost of synchronization which such a visualization would produce, with complete three-dimensional modeling of a non-static reality, is eliminated.

In an advantageous embodiment of the invention, the spatial detection unit comprises a spatial detection device which is provided to detect surface distance points of the actual reality, and a processing unit which is provided to calculate the spatial information, the spatial information describing, in particular, a three-dimensional model of the reality. In this manner, only the information content of the actual reality, required for calculating possible masking surfaces, is detected and modeled, whereby the cost regarding the creation of a complete three-dimensional model of a real geometric arrangement is considerably reduced.

The ambient detection unit advantageously comprises an ambient detection device which is provided for detecting the position and/or the orientation of the device relative to the real ambient, and a processing unit for calculating the ambient information which describes the position and/or the orientation of the device relative to the real ambient, for example in the form of a matrix.

In a typical application of the device according to the invention, a model of an installation and/or a component of the installation is provided as the object described by the information filed in the first storage medium. For example, with a planned installation, a virtual model may be created of the installation to be built and/or of the component of the installation to be built, in order to obtain rapidly a first impression of the system to be planned in the reality provided therefore.

In an advantageous embodiment of the invention, the reproducing unit is configured as a head-mounted display, the objects described by the image information generated by the processing unit being inserted directly into the field of vision of the user, and the user, moreover, directly observing the part of the actual reality not masked by the objects described by the image information. This type of representation of augmented-reality information is the so-called optical see-through method. In this case, the spatial detection device and the ambient detection device are advantageously mounted on the head of the user, so that they are stationary relative to the eye of the user. In an ideal case, the angular field of the spatial detection device and that of the ambient detection device overlap the current field of view of the user, so that the complete field of vision of the user is detected. However, the processing units of the spatial detection unit and the ambient detection unit may be installed on a computer carried by the user.

In an alternative advantageous embodiment, the reproducing unit is configured such that the objects described by the image information generated by the processing unit and the part of the actual reality which is not masked by the objects described by the image information are represented, the device comprising to this end, in particular, at least one image detection unit, which for example is configured as a video camera, for detecting the actual reality. This embodiment allows the representation of augmented-reality information for a plurality of users. This type of representation of augmented-reality information is the so-called video see-through method. In this connection, the parts of the virtual objects described by the image information and not masked by the actual reality, are inserted into the image detected by the video camera and represented on one or more reproducing units, for example by using a video splitter. The reproducing units may be head-mounted displays or, however, conventional monitors which, in particular, may also be positioned at locations remote from the actual reality detected. With this type of design, the spatial detection device, the ambient detection device and the image detection unit may be mounted on the head of a user or on another device, for example a portable computer.

In an embodiment of the device, by using the optical see-through method, in order to be able to calibrate the angular field and the position of the user as accurately as possible with the position and the orientation of the spatial detection device, a second storage medium is advantageously provided which is used to store calibration information, the calibration information describing geometric deviations between the eye of the user, the position of the reproducing system as well as the spatial detection device and the ambient detection device. The second storage medium may alternatively also be implemented with the first storage medium in the form of a common storage medium.

In an embodiment of the device, by using the video see-through method, in order to be able to calibrate the angular field and the position of the video camera as accurately as possible with the position and the orientation of the spatial detection device, the second storage medium is advantageously provided for storing calibration information, the calibration information describing geometric deviations between the position of the video camera, the position of the reproducing system as well as the spatial detection device and the ambient detection device. The second storage medium may alternatively also be implemented with the first storage medium in the form of a common storage medium.

A simple calculation of possible masking of virtual geometric arrangements by arrangements in the actual reality is advantageously implemented by the processing unit, based on the information generated by the spatial detection unit and the ambient detection unit as well as the information filed in the storage media, representing the objects, described by means of the spatial information and by means of the information filed in the first storage medium, in a common coordinates system. Based on this common reference system, the processing unit is able to calculate new image information, in which the surfaces described by the information filed in the first storage medium are blanked out, which surfaces are masked by the surface described by the spatial information in the field of view of the user and/or the video camera. The processing unit for linking the ambient information and spatial information may, together with the processing unit of the spatial detection unit and/or the processing unit of the ambient detection unit, be installed on a computer.

A dynamization of a virtual model of the installation may be carried out with the device according to the invention, by the device comprising at least one simulation system for generating the information filed in the first storage medium. The dynamic processes are calculated by the simulation system. The information filed in the first storage medium for describing the virtual objects is adapted continuously according to the data calculated by the simulation system.

The spatial detection device of the spatial detection unit may, for example, be configured as a radar system, as an ultrasound system, as a laser system or as a stereo camera system. For minimizing the necessary hardware cost, in particular with camera based systems, the spatial detection device and the ambient detection device may be configured in a common detection device. In one embodiment, when using the video see-through method, moreover, the spatial detection device and/or the ambient detection device may also be integrated into the video camera required for this method.

BRIEF DESCRIPTION OF THE DRAWINGS

The invention is described and explained in more detail hereinafter with reference to the embodiments shown in the figures, in which.

DETAILED DESCRIPTION OF THE INVENTION

Figure 1:
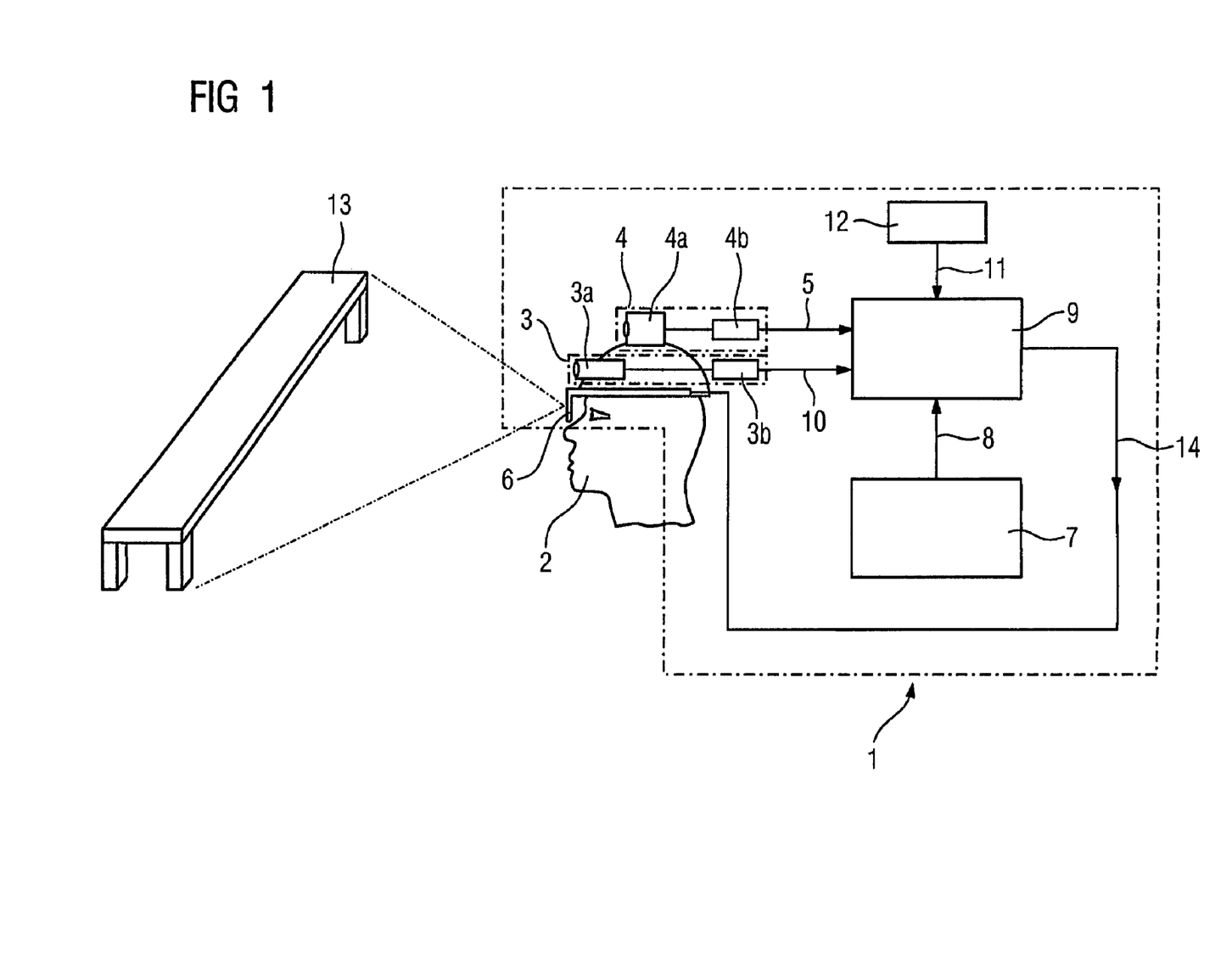
FIG. 1 is a diagrammatic view of a device for representing information, in particular augmented-reality information, for at least one user.

FIG. 1 shows a diagrammatic view of a device 1 for representing information, in particular augmented-reality information, for at least one user 2. The device shown relates to an embodiment which is based on the optical see-through method. By means of a spatial detection unit 3, the user 2 detects an actual reality 13 located in the field of view. A spatial detection device 3a is located on the head of the user 2 as part of the spatial detection unit 3 and which is stationary relative to the eye of the user 2. By means of a processing unit 3b of the spatial detection unit 3, spatial detection information 10 is generated which is forwarded to a processing unit 9.

An ambient detection device 4a is also positioned on the head of the user 2, and with which the position and the angular field of the user 2 may be detected. The ambient detection device 4a is stationary relative to the spatial detection device 3a and relative to the eye of the user 2. A processing device 4b generates, from the detected position and the detected angular field, ambient information 5 which is also forwarded to the processing unit 9.

In an alternative embodiment of the ambient detection unit 4, the ambient detection device comprises a sensor, which is positioned on the head of the user and a further detection device which is set up so that the position and the orientation of the sensor, and thus also of the user, may be detected relative to the actual reality.

Information 8 is filed in a storage medium 7, which, for example describes a virtual geometric arrangement. The virtual geometric arrangement may, for example, be the three-dimensional model of a planned installation or a planned component of the installation. The information 8 which describes the three-dimensional model of such an installation is also delivered to the processing unit 9.

A further storage medium 12 contains calibration information 11 which describes the geometric deviations between the eye of the user 2, the position of a reproducing unit 6 located on the head of the user 2 as well as the spatial detection device 3a and the ambient detection device 4a.

The processing unit 9 now links the spatial information 10, the ambient information 5, the information 8 which describes the three-dimensional model of the virtual installation, and the calibration information 11 to a set of image information 14, such that reciprocal masking of the actual reality and the planned virtual installation are made recognizable by the reproducing unit 6. Via the reproducing unit 6 which is configured, in this example, as a head-mounted display, only one image of the planned virtual installation is shown in which the surfaces masked by the actual reality 13 in the field of vision of the user 2, are blanked out. The part of the actual reality 13 which is not masked by the planned virtual installation, is directly observed by the user.

In this manner, a mixed virtual real ambient is visualized to the user 2, without a complete three-dimensional modeling of the real ambient being required which is time and cost intensive. Dynamic processes may also be visualized within the real ambient, only one continuous calculation of the masked surfaces being able to be carried out.

Figure 2:
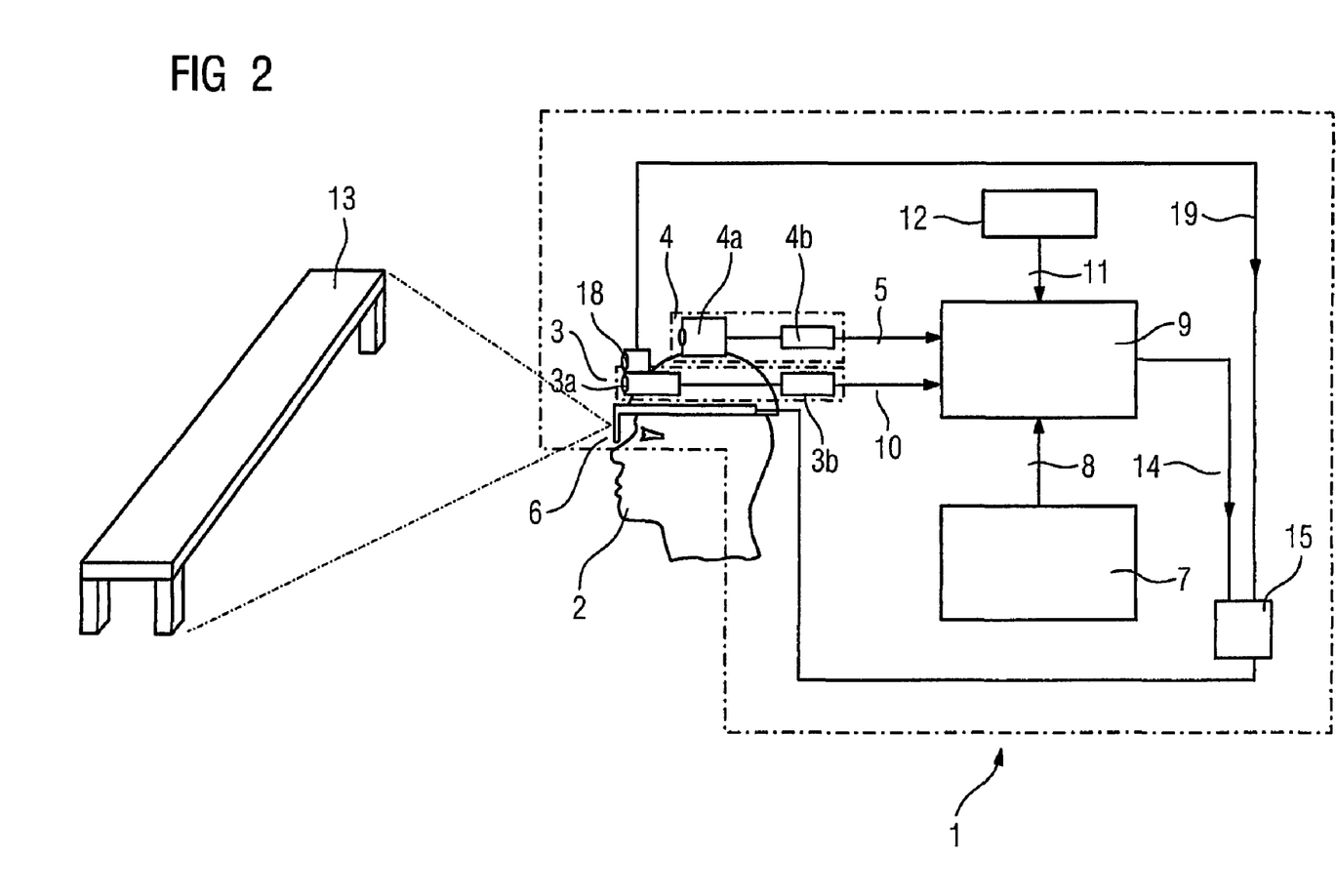
FIG. 2 is a diagrammatic view of an embodiment of the device based on the video see-through method.

FIG. 2 shows a diagrammatic view of an embodiment of the device 1 based on the video see-through method. In this case and also in the description of the further figures, the same reference numerals are used as in FIG. 1. In this embodiment, the device 1 is supplemented by an image detection unit 18, which is, in particular, configured as a video camera. The reproducing unit 6 thus represents the completely augmented reality. In other words, in addition to the image information 14 which describes a model of the virtual installation in which the surfaces masked by the actual reality are blanked out, the part of the actual reality 13 detected by the video camera 18 and which is not masked by the virtual installation, is also represented by means of the reproducing unit 6. To this end, the image of the virtual installation, in which the surfaces masked by the actual reality 13 are blanked out, is inserted into the image detected by the video camera 18. In this type of design, a conversion unit 15 with a mixing function is used in order to generate a corresponding signal which may be represented by the reproducing unit 6. Said conversion unit may be designed using both software technology and hardware technology, for example as a video card with corresponding functionality.

In the embodiment shown, the spatial detection device 3a, the ambient detection device 4a and the image detection unit 18 are positioned on the head of the user 2. The reproducing unit 6 used for visualizing the augmented reality is also connected to the head of the user 2, for example in this case a head-mounted display.

Figure 3:
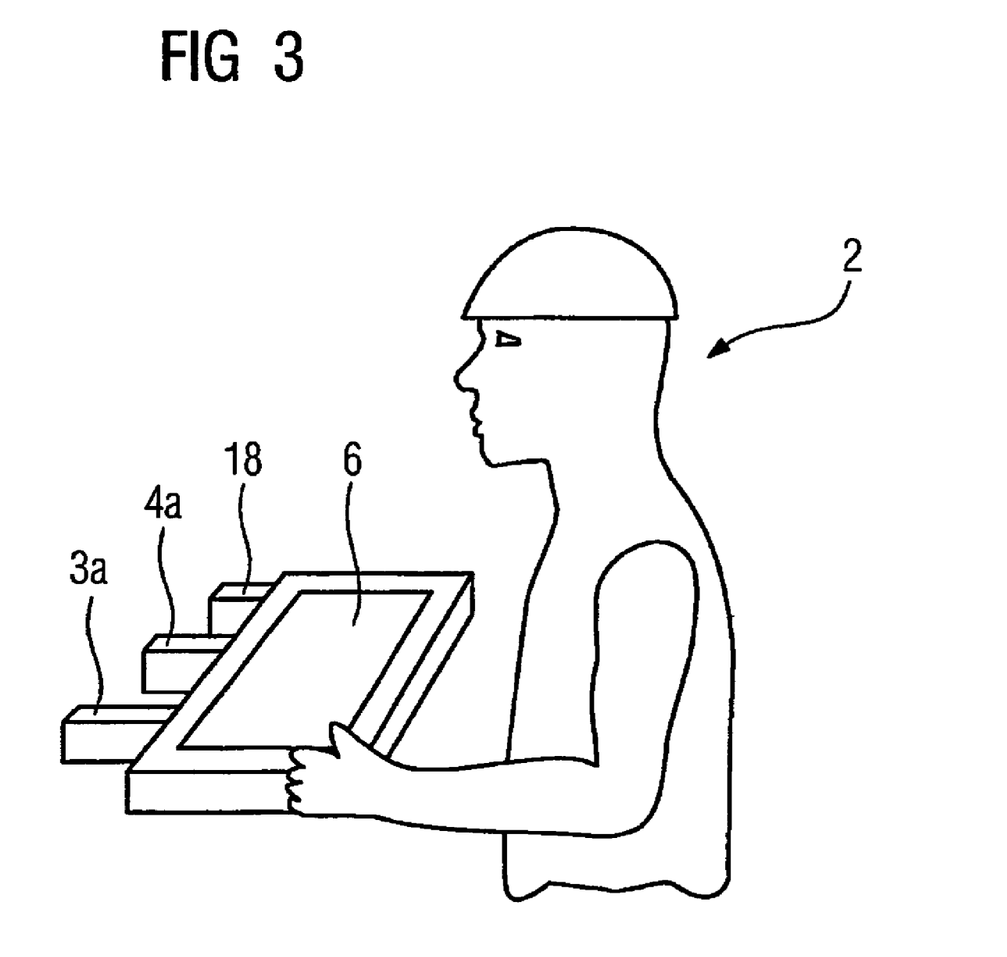
FIG. 3 is an alternative device for representing information which is based on the video see-through method and FIG. 4 is a representation of a typical application scenario of an embodiment of the device shown in FIG. 1.

FIG. 3 shows an alternative device for representing information which is based on the video see-through method. In this embodiment of the device 1, the spatial detection device 3a, the ambient detection device 4a, the image detection unit 18 as well as the reproducing unit 6 are mounted on a portable computer. This embodiment allows a plurality of users to observe the augmented reality. Furthermore, by means of a video splitter, the representation of the augmented reality is also possible on a plurality of reproducing units.

Figure 4:
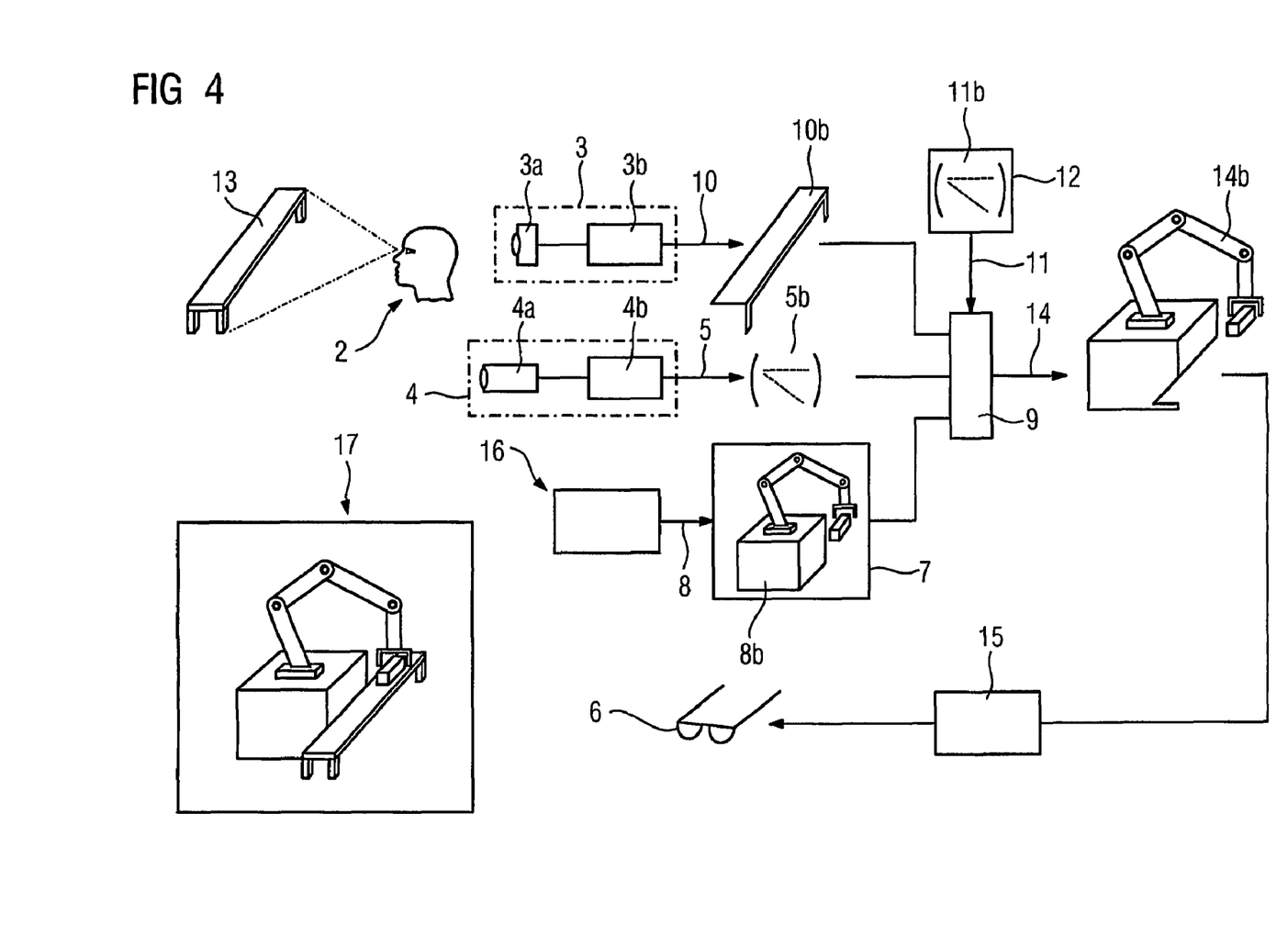

FIG. 4 shows a typical application scenario of an embodiment of the device shown in FIG. 1. An actual reality 13 which, for example, may be a conveyor belt, is located in the field of view of a user 2. The spatial detection device 3a of the spatial detection system 3 detects the part of the conveyor belt 13 located in the field of view of the user 2. The processing unit 3b of the spatial detection unit 3 models the surfaces of the conveyor belt 13 located in the field of view of the user 2 into a three-dimensional surface model 10b.

By means of the ambient detection unit 4 which, for example, is a commercially available tracking system, the position and the angular field of the user 2 to the actual reality are detected. The processing unit 4b of the ambient detection unit 4 generates therefrom information 5 which is represented in the form of a matrix 5b.

A simulation system 16 continuously generates a data set 8 which describes the 3D model 8b of a virtual geometric arrangement, in this example of a robot. In this manner, a dynamization of the virtual robot is carried out in the augmented reality. The corresponding data set 8 is filed in a first storage medium 7.

In a second storage medium 12 the aforementioned calibration information 11 is filed in the form of a matrix 11*b* and/or a plurality of matrices.

By means of the calibration information 11 and the ambient information 5, the processing unit 9 now represents the three-dimensional surface model 10*b* of the real arrangement 13 (in this case of the conveyor belt) and the three-dimensional model 8*b* of the virtual arrangement (in this case a virtual robot) in a common coordinates system. Within this coordinates system, the processing unit 9 calculates the masking of the virtual robot, caused by the conveyor belt. As a result, the processing unit 9 generates a new data set 14 which, in turn, describes a virtual model 14*b* of the robot, in which the surfaces masked by the conveyor belt are blanked out.

The model 14*b* of the virtual robot, in which the masking by the conveyor belt is blanked out, is converted by means of a video card 15 into a signal represented by the reproducing unit 6.

By simultaneous detection of the model 14*b* of the virtual robot and the real conveyor belt represented by means of the reproducing unit 6, the user 2 sees a mixed virtual real image 17 in which by blanking out the surfaces calculated by the processing unit 9, the desired three-dimensional impression is transmitted. The necessity of a three-dimensional modeling of the conveyor belt, which is time and cost intensive, is eliminated with the device according to the invention and/or the method according to the invention.

In summary, the invention relates to a device and a method for representing virtual and real ambient information for one or more users, virtual arrangements and real arrangements being represented such that masking of the virtual arrangements is made recognizable by real arrangements. By means of an ambient detection unit 4 the relative position and orientation of the device is detected in the real ambient. Additionally, by means of a spatial detection unit 3 a detection of the reality and its conversion into a three-dimensional surface model is carried out continuously. A processing system 9 transfers the three-dimensional surface model of the real arrangement and the three-dimensional model of the virtual arrangement into a common coordinates system and calculates possible masking surfaces of the virtual arrangement by the real arrangement.

The invention claimed is:

1. A device for representing augmented-reality information for a user, comprising:
   a spatial detection unit having a spatial detection device for positioning on the head of a user to be stationary relative to an eye of the user that moves relative to movement of the head of the user, wherein the spatial detection unit continuously
   (a) detects surface distance points for only a viewable surface of an actual reality which represents only a part of the actual reality that is in a field of view of the user and not obstructed by surfaces in front of it rather than an entire actual reality in three-dimensions, and
   (b) dynamically generates from the surface distance points detected corresponding spatial information comprising a partial surface model of only the viewable surface rather than the entire actual reality in three-dimensions, wherein the spatial information comprises limited information used for calculating partial masking surfaces for only the viewable surface rather than a complete 3D surface model of the entire actual reality, thereby reducing cost calculations by using the partial masking surfaces rather than the complete 3D surface model of the entire actual reality;
   an ambient detection unit for positioning on the head the user to be stationary relative to the spatial detection device and the eye of the user that moves relative to movement of the head of the user, wherein the ambient detection unit continuously detects ambient information representing a position and an angular field of the user with respect to the actual reality;
   a storage unit comprising three-dimensional (3D) object data describing a virtual object;
   a processing unit that
      receives the continuously dynamically generated partial surface model for only the viewable surface of the actual reality in the field of view of the user, the ambient information representing position and angular field of the user with respect to the actual reality, and the 3D object data describing the virtual object;
      continuously constructs a 3D surface model of the actual reality that comprises only content of the actual reality required for calculating masking surfaces based on the partial surface model detected and the ambient information representing relative movement of the head of the user changing the field of view of the user, rather than a complete 3D model of the actual reality;
      calculates which surfaces of the virtual object are to be masked by the viewable surface of the actual reality based on the continuously dynamically generated spatial information without using the complete 3D surface model of the entire actual reality;
      generates a new data set for display to the user as an augmented-reality comprising a virtual model that describes the virtual object with the surfaces of the virtual object masked by the viewable surface of the actual reality blanked out; and
      displays to the user via a reproducing unit the augmented-reality inserted into the field of view of the user while the user directly observes the actual reality or indirectly observes a separately captured viewable image of the actual reality.

2. The device as claimed in claim 1, wherein the spatial detection unit comprises: a spatial detection device that detects surface distance points of the part of the actual reality located in the field of view of the user.

3. The device as claimed in claim 1, wherein the ambient detection unit describes the position and the angular field of the user with respect to the part of the actual reality in the form of a matrix.

4. The device as claimed in claim 1, wherein the virtual object is a 3D model of an installation or a component of the installation.

5. The device as claimed in claim 1, wherein the reproducing unit comprises an optical see-through head-mounted display, wherein the new data set comprising the virtual model is inserted directly into a field of vision of the user while the user directly observes the actual reality.

6. The device as claimed in claim 1, wherein the reproducing unit comprises a video see-through display further comprising an image detection unit configured as a video camera that separately captures the viewable image of the actual reality for display to the user along with the new data set comprising the virtual model.

7. The device as claimed in claim 1, further comprising a second storage medium that stores calibration information for calibrating one or more of deviations between an eye of the user, a position of a reproducing unit, a position of the spatial detection unit and the ambient detection unit.

8. The device as claimed in claim 7, wherein the second storage medium describes geometric deviations between the spatial detection unit and the ambient detection unit.

9. The device as claimed in claim 1, wherein the processing unit calculates surfaces of the virtual object masked by the viewable surface of the actual reality based on the dynamically generated spatial information in a common coordinates system.

10. The device as claimed in claim 1, wherein the spatial detection unit is configured as a radar system, an ultrasound system, a laser system or a stereo camera system to detect surface distance points.

11. The device as claimed in claim 1, wherein the spatial detection unit and the ambient detection unit are configured in a common detection device.

12. A method for representing augmented-reality information for a user, comprising:

constructing a 3D surface model of an actual reality, carried out continuously, by:

(a) detecting surface distance points for only a viewable surface of an actual reality which represents a part of the actual reality that is currently in a field of view of a user and not obstructed by surfaces in front of it rather than an entire actual reality in three-dimensions by a spatial detection unit having a spatial detection device for positioning on the head of the user to be stationary relative to an eye of the user that moves relative to movement of the head of the user and continuously detects said viewable surface relative to such movement;

(b) dynamically and continuously generating spatial information based on the continuously detected surface distance points of the actual reality comprising a partial surface model of only the viewable surface rather than the entire actual reality in three-dimensions, wherein the spatial information comprises limited information used for calculating partial masking surfaces for the viewable surface rather than a complete 3D surface model of the entire actual reality, thereby reducing cost calculations by using the partial masking surfaces rather than the complete 3D surface model of the entire actual reality;

(c) detecting an ambient environment by an ambient detection unit for positioning on the head the user to be stationary relative to the spatial detection device and the eye of the user that moves relative to movement of the head of the user;

(d) generating ambient information representing a position and an angular field of the user with respect to the part of the actual reality based on the detected ambient environment;

(e) receiving by a processing unit the dynamically and continuously generated partial surface model for the viewable surface of the actual reality in the field of view of the user, the ambient information representing position and angular field of the user with respect to the actual reality, and three-dimensional (3D) object data describing a virtual object, (f) constructing the 3D surface model of the actual reality that comprises only content of the actual reality required for calculating masking surfaces based on the partial surface model detected and the ambient information representing relative movement of the head of the user changing the field of view of the user, rather than a complete 3D model of the actual reality;

calculating by the processing unit which surfaces of the virtual object are to be masked by the viewable surface of the actual reality based on the continuously and dynamically generated spatial information without using the complete 3D model of the entire actual reality; and generating a new data set for display to the user as an augmented-reality comprising a virtual model that describes the virtual object with the surfaces of the virtual object masked by the viewable surface of the actual reality blanked out; and displaying to the user via a reproducing unit the augmented-reality inserted into the field of view of the user while the user directly observes the actual reality or indirectly observes a separately captured viewable image of the actual reality.

13. The method as claimed in claim 12, wherein: a plurality of surface distance points of the part of the actual reality located in the field of view of the user are detected by a spatial detection device that is a component of the spatial detection unit.

14. The method as claimed in claim 12, wherein: the ambient detection unit describes the position and the angular field of the user with respect to the part of the actual reality in the form of a matrix.

15. The method as claimed in claim 12, wherein the virtual object is a 3D model of an installation or a component of the installation.

16. The method as claimed in claim 12, wherein the new data set comprising the virtual model is displayed by the reproducing unit, which is an optical see-through head-mounted display, into a field of vision of the user while the user directly observes the actual reality.

17. The method as claimed in claim 12, wherein the new data set comprising the virtual model is represented by the reproducing unit in the form of a video see-through display configured with a video camera that separately captures the viewable image of the actual reality for display to the user along with the new data set comprising the virtual model.

18. The method as claimed in claim 12, further comprising calibration information for calibrating one or more of deviations between an eye of the user, a position of a reproducing unit, a position of the spatial detection unit and the ambient detection unit.

19. The method as claimed in claim 18, wherein the calibration information describes geometric deviations between the spatial detection unit and the ambient detection unit.

20. The method as claimed in claim 12, wherein the spatial detection unit is configured as a radar system, an ultrasound system, a laser system or a stereo camera system to detect surface distance points.

* * * * *